United States Patent

[11] 3,582,816

| [72] | Inventors | Lawrence Waszak<br>North Massapequa, L. I.;<br>Joseph J. Duffy, Northport, both of, N.Y. |
|---|---|---|
| [21] | Appl. No. | 773,499 |
| [22] | Filed | Nov. 5, 1968 |
| [45] | Patented | June 1, 1971 |
| [73] | Assignee | Hadron, Inc.<br>Westbury, N.Y. |

[54] LASER HEAD CONSTRUCTION
17 Claims, 4 Drawing Figs.

[52] U.S. Cl............................................. 331/94.5
[51] Int. Cl............................................. H01s 3/02
[50] Field of Search................................ 331/94.5;
330/4.3

[56] References Cited
UNITED STATES PATENTS

| 3,265,989 | 8/1966 | Gurs.............................. | 331/94.5 |
| 3,387,227 | 6/1968 | Mastrup et al................ | 331/94.5 |

*Primary Examiner*—William L. Sikes
*Attorney*—Yuter and Spiecens

ABSTRACT: A laser head construction including a plastic housing having a central member and end caps connected thereto. An inner housing having a hollow interior defining a cavity is spaced from the outer housing by a reflective material. Within the cavity is a flash lamp and a laser. Electrodes are provided to initiate operation of the lamp and to shield the housing from rays emitted by the flash lamp.

LASER HEAD CONSTRUCTION

This invention relates generally to a laser head construction and, more particularly, pertains to an economic and reliable laser head.

Presently available laser heads or laser head constructions suffer from a number of disadvantages. For example, commercially available laser heads utilize metal housings which substantially increase the cost of such heads in addition to rendering them extremely heavy and bulky. While it is desirable to fabricate such heads from a plastic material, it has been found that the ultraviolet rays from the laser have a deleterious effect on the plastic. Additionally, laser head constructions now in use are fabricated from a great many elements which, in addition to increasing the overall cost of such devices, also increases the possibility of malfunctions arising which render the heads inoperable.

Accordingly, an object of the present invention is to provide an improved laser head construction.

A more specific object of this invention is to provide a relatively inexpensive laser head construction.

Another object of this invention resides in the novel details of construction which provide a laser head construction of the type described which utilizes one element to perform the functions of a number of elements thereby reducing the number of parts comprising the laser head.

Accordingly, a laser head construction made in accordance with the present invention includes a housing having an outer section with first and second end caps connected thereto. Spaced from the outer section by a reflecting material is an inner housing. First openings are provided in said end caps for receiving a flash lamp and first support means are adapted to support the lamp therein. Second openings are provided in said end caps for receiving a laser and second support means are adapted to support the laser therein in energy-receiving relationship to the flash lamp. Electrode means are mounted on said first and second end caps for initiating operation of the flash lamp and for shielding said first and second end caps from rays emitted by the flash lamp.

Other features and advantages of the present invention will become more apparent from a consideration of the following detailed description when taken in conjunction with the accompanying drawings, in which.

Figure 1:
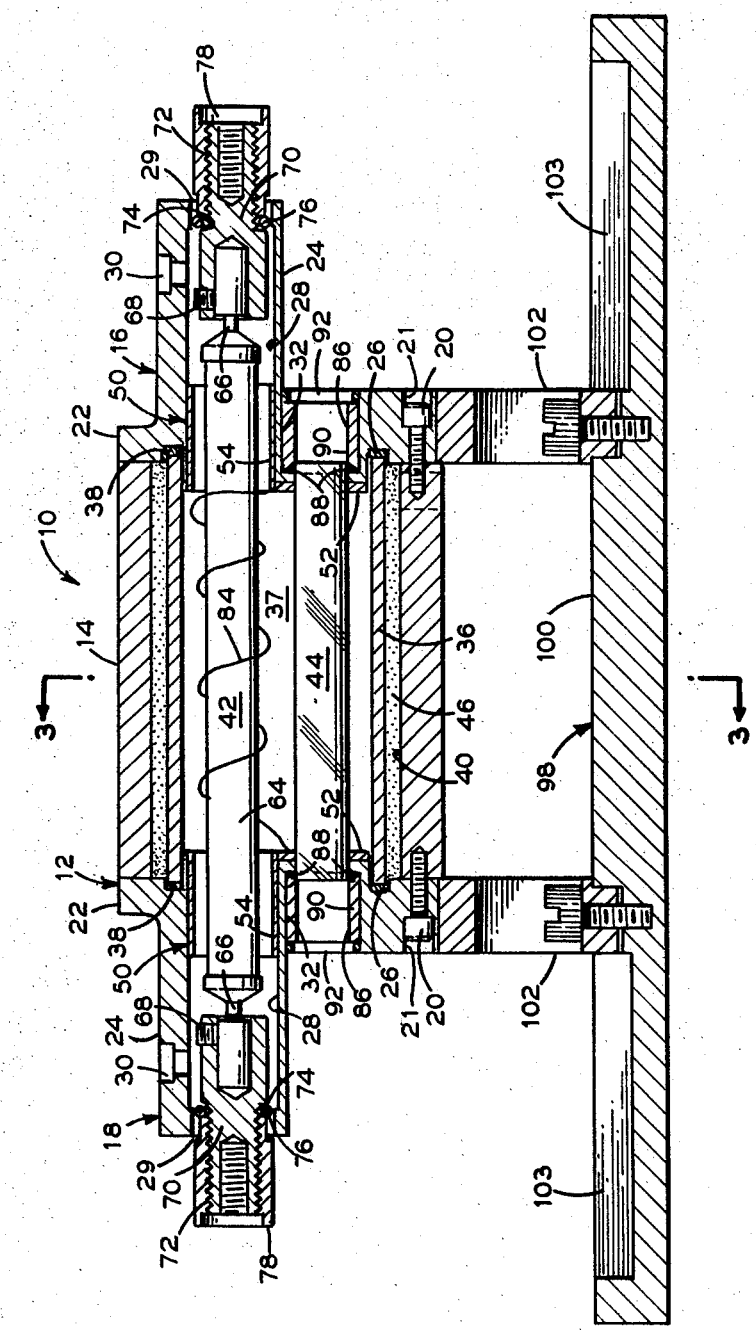
FIG. 1 is a vertical sectional view of a laser head constructed according to the present invention.
Figure 2:
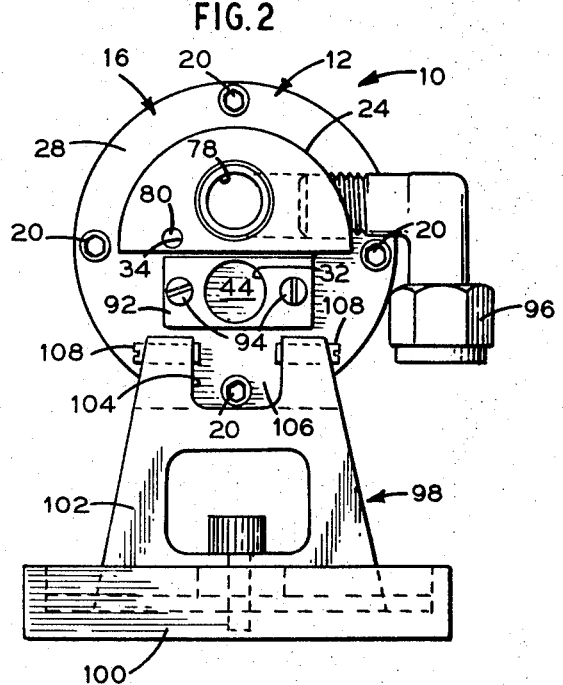
FIG. 2 is an end elevational view thereof.
Figure 3:
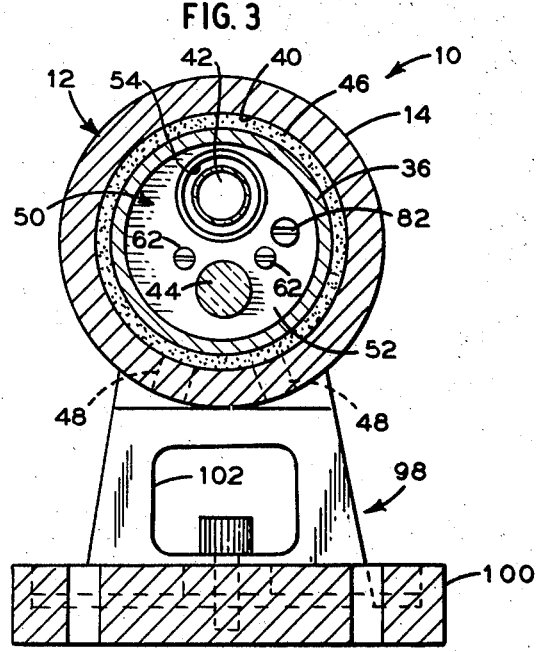
FIG. 3 is a sectional view taken along the line 3—3 of FIG. 1.

A laser head constructed in accordance with the present invention is designated generally by the reference numeral 10 in FIGS. 1—3 and includes a housing designated generally by the reference numeral 12. More specifically, the housing 12 comprises a central hollow cylindrical outer section 14, an end cap 16 and an end cap 18. The end cap 16 is connected to the right-hand end of the section 14 and the end cap 18 is connected to the right-hand end of the section 14 and the end cap 18 is connected to the left-hand end of section 14 by circumferentially spaced screws 20 which extend through bores 21 in the end caps. The housing 12 may be fabricated from a plastic material having the properties of low water absorption, high resistance to ultraviolet light damage, high dielectric strength, and the ability to be molded or cast and machined easily. In practice, the outer section 14 and the end caps 16, 18 are fabricated from Lucite. Since the end caps 16, and 18 are identical in construction, only the end cap 16 will be described in detail. Corresponding portions of the end caps are indicated by the same reference numerals.

Figure 4:
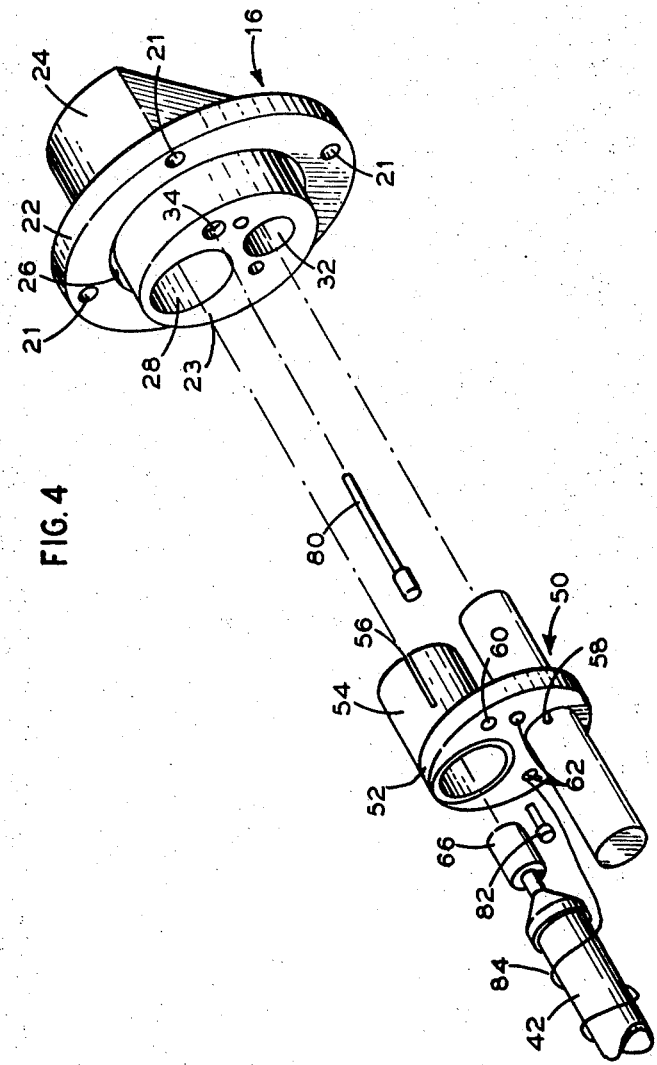
FIG. 4 is a perspective exploded detail view, to an enlarged scale, of the trigger electrode and to the left-hand end of section 14 by construction shown in FIG. 1.

Accordingly, the end cap 16 includes a radial portion 22 and an integral outwardly extending member 24 (FIG. 4). Provided on the inner surface of the portion 22 is an annular groove 26 and a boss 23. A bore 28 extends through the portions 23 and 24 of the end cap. A bleeder valve 30 (FIG. 1) communicates with the bore 28. A second smaller through bore 32 is spaced below the bore 28 and, as shown in FIG. 1, is located below the member 24. Another recessed through bore 34 is provided in the portion 23 and member 24 of the end cap. As shown in FIG. 4, the bores 28, 32 and 34 are located within the are defined by the groove 26.

When the end caps 16, 18 are connected to the outer section 14 the correspondingly numbered elements are aligned with each other. That is, the bores 28 are in alignment as are the bores 32 and 34. Received in the grooves 26 in the respective end caps 16, 18 are the end edges of a transparent inner cylinder or housing 36. Respective gaskets or O-rings 38 are received in the grooves 26 so that the housing 36 scalingly engages the end caps.

The interior of the cylinder 36 is hollow and defines a cavity or pump enclosure 37 which receives a flash lamp 42 and a laser crystal 44, as noted in detail below. The housing 36 is concentric with the outer section 14 and is spaced therefrom to define an annular space 40. Received within the space 40 is a light reflecting material 46 which completely surrounds the housing 36 to reflect light from the flash lamp 42 back into the cavity 37.

As noted above, plastic materials such as the section 14 are affected by ultraviolet light rays. Accordingly, the housing 36 preferably is fabricated from a light transparent material having ultraviolet ray absorbing characteristics, to prevent such rays from reaching the outer section. In practice, the housing 36 is made of Pyrex which has the desired properties and functions to filter ultraviolet light from the material 46 and the outer section 14. Also, it is desirable to provide a reflecting material having a high reflectivity and little or no ultraviolet light absorbing properties which would cause a yellowing in the reflect material. Accordingly, in practice the reflecting material 46 comprises magnesium oxide powder. This material has the desired properties. The space 40 is filled with the powdered material 46 through the openings 48 (FIG. 3) in the outer section 14. Thus, one of the openings 48 serves as a vent while the powder or material 46 is introduced into the other opening. Appropriate plugs are provided to seal the openings.

In order to prevent ultraviolet light from the flash lamp 42 from reaching the inner surfaces of the plastic end caps 16 and 18, shield 50 are connected to each end cap. In accordance with an aspect of the invention, the shields 50 are connected as flash lamp trigger electrodes or flash lamp electrodes to initiate operation of the flash lamp 42. Hence, this single element shields the end caps from ultraviolet light and, additionally, functions to trigger the flash lamp. Since both shields 50 are identical, only the shield associated with end cap 16 is described.

More specifically, as shown in FIG. 4, the shield 50 includes a circular portion 52 which is in flush abutment with the inner wall surface of the cap 16 since it is this portion of the end cap which is exposed to light from the flash lamp (FIG. 1). The housing 36 engages the edge of the portion 52 of the shield 50 in a sliding fit so that the entire inner wall surface of the end cap is shielded by the portion 52 of the shield. Extending outwardly from the portion 52 is a tubular section 54 which is received in the bore 28 and which terminates a short distance beyond the inner wall of the end cap. The section 54 is slotted at 56 so that the section may be compressed slightly when it is inserted into the bore 28 to engage the same in a tight sliding fit.

Circular portion 52 of the shield 50 is further provided with aperture 58 and 60 which are respectively aligned with the bores 32 and 34 in the associated end cap. The shield 50 is connected to the inner wall of the end cap 16 by a pair of screws 62. Since the shield 50 is operable to initiate operation of the flash lamp 42 in addition to shielding the end cap from ultraviolet rays of light, it is fabricated from a metallic electrical conductor such as stainless steel or the like. The arrangement of the other shield 50 and the end cap 18 is identical to that above described.

As noted above, the flash lamp 42 is received within the cavity 37. More particularly, the flash lamp 42 includes a main body portion 64 having respective end elements 66. Mounted on the end elements 66 and affixed in place by respective set screws 68 are lamp connectors 70. As shown in FIG. 1, the lamp 42 extends through the cavity 37 and the ends thereof are received within the opposed bores 28 of the end caps 16, 18. It is also to be noted that the tubular section 54 of the shields terminate just short of the end elements 66 of the flash lamp to protect the portions of the walls defining the bores 28 which are exposed to the flash lamp from ultraviolet rays.

The bores 28 and the inner diameter of the tubular sections 54 of the shields 50 are substantially greater than the diameter of the flash lamp 42. However, the flash lamp 42 is supported substantially centrally in the bores 28. More specifically, each of the connectors 70 includes a reduced diameter portion 72 which terminates in a shoulder 74. Abutting the shoulder 74 are respective compressible gaskets or O-rings 76. Threadedly engaging the respective ends of the connectors 70 are respective gland nuts 78 which move axially as they are turned. Accordingly, when the lamp 42 is installed in the housing 12, the lamp is centered and the gland nuts 78 are moved inwardly to compress the respective O-rings 76 against the shoulders 74. The O-rings 76 expand radially as a result until they engage the constricted outer portion 29 of the bores 28. Thus, the flash lamp is sealingly mounted in the cavity 37.

As set forth hereinabove, the shields 50 also function as electrodes to produce the necessary electric field to initiate ionization of the gas within the flash lamp 42. Accordingly, a respective feed-through terminal 80 is provided for each shield to connect the shields with a source of energy (not shown). Thus, the terminal 80 shown in FIG. 4 is connected to the circular portion 52 of the shield 50 by a screw 82. The terminal 80 extends through the bore 34 in the end cap 16 and is accessible from the exterior so that a source of energy may be connected thereto. Additionally, the electrodes further include a wire 84 which extends from one shield 50 to the other and is coiled about the flash lamp 42. The wire or lead 84 is connected to the respective shields by looping the same about a screw 62. In practice, the flash lamp is filled with xenon and it is found that the shields 50 together with the lead 84 produce the required electric field to initiate ionization or operation of the lamp 42.

The laser 44, which may be a ruby laser crystal neodymium doped glass, neodymium YAG (yttrium-aluminum-garnate) or the like, is positioned in the cavity 37 in energy receiving relationship to the flash lamp 42. The ends of the laser 44 extend through the apertures 58 in the respective shields 50 and terminate short of the ends of the respective bores 32 in the end caps 16, 18. Seal rings 86 are slidingly received in the respective bores 32 and sealingly support the laser 44.

To be more specific, each seal ring 86 includes an O-ring 88 received on a tapered surface in the end of the seal rings. The ends of the laser 44 are received in bores 90 in the seal rings 86 and the O-rings 88 engage the same in a sealing fit. Respective windows 92 are received in recesses at the outer ends of the respective bores 32 and maintain the seal rings 86 in place. The windows 92 are maintained in place by screws 94 (FIG. 2) and provide a means for permitting the output light from the laser 44 to pass outwardly from the housing 12.

It will now be obvious that the shield 50, in addition to the above-noted functions, also protects the O-rings 76 and 88 from the flash lamp light rays. Moreover, it is to be noted that the cavity 37 is effectively sealed by the respective O-rings noted hereinabove. Thus, a coolant such as water or the like may be made to flow in the cavity 37, about the flash lamp 42 and the laser 44. The O-rings 38, 76 and 88 prevent leakage of the coolant. Accordingly, an inlet conduit 96 (FIG. 2) communicates with the bore 28 in the end cap 16 to provide a means for introducing a coolant (not shown) into the cavity 37. A similar conduit (not shown) is connected with the bore 28 in the end cap 18 to provide an exit for the fluid so that a turbulent flow may be produced in the cavity 37. The bleeder valves 30 permit air to be exhausted from the cavity when liquids are introduced as the coolant.

A base, designated generally by the reference numeral 98, is provided to support the housing 12. The base 98 includes a base plate 100 and a pair of spaced upstanding brackets 102 connected thereto. The base plate 100 is provided with recessed wells 103 which are positioned to receive coolant leaking out of the bores 28 during replacement of a flash lamp. Each bracket 102 is provided with an upper open-ended socket 104 which receives a complementary shaped block 106 on the end caps. Screws 108 extends through the legs defining the socket 104 and into the block 106 to connect the housing 12 with the base 98.

The operation of the laser head of the present invention is conventional and is not described in detail. Briefly, the energy source is connected between the terminals 80 to cause an electric field to be set up by the shields 50 and the lead 84 to ionize the gas in the flash lamp 42. The operation of the flash lamp 42 excites the particles in the laser 44 until the laser produces a light beam through one or both of the windows 92.

Accordingly, a laser head construction has been disclosed which is fabricated form plastic but which is not susceptable to deterioration from ultraviolet light from the flash lamp, which uses a minumum of elements, and which is economic to fabricate and reliable in operation.

While a preferred embodiment of the invention has been shown and described, it will be obvious that numerous omissions, changes and additions may be made in such embodiment without departing from the spirit and scope of the present invention.

What we claim is:

1. A laser head construction including a housing having an outer section, a first end cap connected to one end of said outer section and a second end cap connected to the other end of said outer section; an inner housing in said outer section, a space between said inner housing and said outer section, a reflecting material in said space, first openings in said first and second end caps for receiving a flash lamp positioned within said inner housing, first support means for supporting the flash lamp in said first openings, second openings in said first and second end caps for receiving a laser in energy-receiving relationship with a flash lamp received in said first openings, second support means for supporting the laser in said second openings, and electrode means mounted on said first and second end caps for initiating operation of the flash lamp and for shielding said first and second end caps from rays emitted by the flash lamp.

2. A laser head construction as in claim 1, in which said inner housing is fabricated from Pyrex.

3. A laser head construction as in claim 1, in which said light reflecting material comprises powdered magnesium oxide.

4. A laser head construction as in claim 1, in which said outer section and said first and second end caps are fabricated from Lucite.

5. A laser head construction as in claim 1, in which said outer section and said first and second end caps are fabricated from a plastic material.

6. A laser head construction as in claim 5, in which said electrode means includes a pair of electrically conductive members individually mounted on said first and second end caps; each of said members having an area sufficient to cover the surfaces of the associated end cap exposed to light emitted from a flash lamp received in said first openings, and terminal means on said members adapted to be connected to a source of energy.

7. A laser head construction as in claim 6, in which each of said members comprises a plate sized to cover the end surface of the associated end cap, and an outwardly extending hollow projection slidable received in said first opening in the associated end cap, said hollow projection having an inner dimension greater than the dimension of a flash lamp received in said first openings whereby said projection is spaced from the flash lamp, and electrically conductive lead means connected between said terminal means of said pair of members adapted to be coiled about the flash lamp.

8. A laser construction as in claim 1, in which said first support means includes gasket means for sealingly retaining a flash lamp in said first openings, said second support means including gasket means for sealingly retaining a laser in said second openings, and conduit means for introducing a coolant into said inner housing.

9. A laser head construction comprising a housing having a cylindrical outer section of plastic material, and first and second end caps of plastic material individually connected to opposite ends of said outer section; an inner cylindrical housing in said outer section having a hollow interior defining a cavity and being spaced from said outer section to define a cylindrical space therebetween, a reflective material in said space, a flash lamp, lamp support means for supporting said flash lamp in said cavity, a laser, laser support means for supporting said laser in said cavity in energy-receiving relationship to said flash lamp, and electrode means operatively associated with said flash lamp for initiating operation of said flash lamp.

10. A laser head as in claim 9, in which said electrode means includes a pair of electrically conductive members, mounting means for mounting said respective members on said first and second end caps, each of said members having a face plate covering the end surface of the associated end cap to shield the associated end cap from rays emitted by said flash lamp.

11. A laser head as in claim 9, in which said lamp support means includes first aligned through bores in said first and second end caps receiving the respective ends of said flash lamp, and lamp retaining means in said first bores for retaining said lamp in said bores; and said laser support means includes second aligned bores in said first and second end caps receiving the respective ends of said laser, and laser retaining means in each of said second bores for retaining said laser in said bores.

12. A laser head as in claim 11, wherein said lamp retaining means includes a gasket for sealingly retaining said lamp in said first bores, and said laser retaining means includes a gasket for sealingly retaining said laser in said second bores, and conduit means communicating with said cavity to provide a path for the flow of a coolant about said flash lamp and said laser.

13. A laser head as in claim 11, in which said flash lamp includes connectors at each end; a shoulder on each connector; said lamp retaining means including a compressible gasket abutting each shoulder, and axially movable bushings on each connector adapted to be moved into engagement with the respective gaskets to cylinder, said gaskets, whereby said gaskets expand into sealing engagement with the walls defining said respective first bores.

14. A laser head as in claim 11, in which said electrode means includes a pair of electrically conductive members, each of said members including a face plate mounted on a respective one of said first and second end caps and having a diameter substantially equal to the diameter of said inner cylinder outwardly extending tubes on each of said members received in a respective on of said first bores, openings in said face plates aligned with said second bores receiving said laser therein, and outwardly extending terminal means connected to said face plates adapted to be connected with a source of energy.

15. A laser head as in claim 14, and an electrically conductive lead connected to said terminal means and coiled about said flash lamp.

16. A laser head as in claim 10, in which said outer housing and said first and second end caps are fabricated from Lucite and said inner housing is fabricated from Pyrex.

17. A laser head as in claim 10, and a supporting base connected to said housing.